United States Patent Office 3,632,646
Patented Jan. 4, 1972

3,632,646
SUCCINAMIDES
Howard A. Hageman, Southbury, Arthur H. Gevirtz,
New Haven, and Bogislav von Schmeling, Hamden,
Conn., assignors to Uniroyal, Inc., New York, N.Y.
No Drawing. Filed May 25, 1967, Ser. No. 641,161
Int. Cl. C07c *103/32*
U.S. Cl. 260—559
7 Claims

ABSTRACT OF THE DISCLOSURE

The invention comprises succinamide derivatives which are useful as plant growth regulants.

---

This invention relates to new compounds and their use as plant growth regulants.

The compounds of the invention may be represented by the formula:

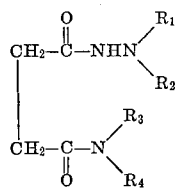

wherein $R_1$ and $R_2$ may be an alkyl group having from 1 to 12 carbon atoms, or, along with the nitrogen, form a non-aromatic heterocyclic ring, such as, 1-pyrrolidyl, 1-piperidyl or 4-morpholinyl; and $R_3$ and $R_4$ may be hydrogen, an alkyl group having 1 to 12 carbon atoms, or compositely, along with the nitrogen atom, form a non-aromatic heterocyclic ring. Furthermore, where $R_4$ is hydrogen, $R_3$ may also be hydroxyalkyl, aminoalkyl, amino, R'NHCO— where R' is hydrogen or a lower alkyl group having from 1 to 6 carbon atoms, or where $R_3$ is an aryl or substituted aryl group wherein the aryl group is phenyl or naphthyl and the substitutions may be from 1 to 3 halogen, lower alkoxy, phenoxy, lower alkyl, aryl cyano, carboxyl, hydroxyl or nitro groups. The preferred substituents being those which are orthopara directors and substituted at the ortho and para positions.

Examples of $R_1$ and $R_2$ are: methyl, isopropyl, isobutyl, octyl, dodecyl, and compositely $R_1$ and $R_2$ represent tetramethylene, pentamethylene and β-oxydiethylene. Examples of $R_3$ are hydroxypropyl, N-dimethylamino ethyl, 2-naphthyl, 2-iodophenyl, 2-isopropylphenyl, 4 - methoxyphenyl, 2 - chloro - 6-methylphenyl, 2,4-dichlorophenyl, 2 - dimethylaminophenyl, 2 - hydroxyphenyl, 2-cyanophenyl, 2-carbomethoxyphenyl, 2-acetoxyphenyl.

The compounds of the present invention may be prepared by either of two methods. The first involves preparation through the imide by reaction with an equimolar amount of amine or hydrazine using an inert solvent e.g. benzene, acetonitrile.

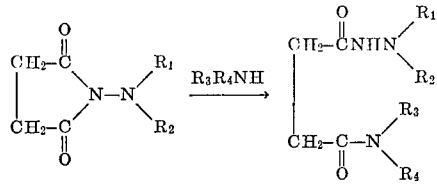

When $R_3R_4NH$ is considerably less basic than $$R_1R_2N-NH_2$$

(differ by an order of magnitude) this procedure requires unduly long reaction periods even with excess $R_3R_4NH$. In these cases the following procedure is preferable. In this procedure the N—$R_3$ substituted imide is prepared according to procedures known to those experienced in the art. This imide is then reacted with the desired hydrazine.

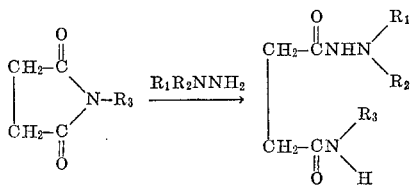

The amount of hydrazine required is dependent upon the nature of $R_3$ and may vary from equimolar amounts to a 3 fold excess. The reaction may be carried out without any solvent or in any inert solvent, such as acetonitrile, or benzene. The preferred solvents being those in which the imide is at least slightly soluble. The reaction time varies from 3 hours to 1 day depending upon the nature of $R_1R_2NNH_2$ and $R_3$.

EXAMPLE I

N-dimethylaminosuccinamide

To 7.1 g. (.05 mole) of N-dimethylaminosuccinimide of M.P. 56–57° C. were added 10 g. of 27% aqueous ammonia. The mixture was agitated and after a few minutes the solid dissolved; thereafter the solution rapidly set to a mass of white crystals. After adding 10 ml. of ethanol, the mixture was heated to 65° C. causing complete solution of the solid. Upon cooling this solution in an ice bath there precipitated 5.0 g. of N-dimethylaminosuccinamide as white crystals of M.P. 192–193° C.

EXAMPLE II

N-dimethylamino-N'-phenylsuccinamide

To 17.5 g. (.10 mole) of N-phenylsuccinimide of M.P. 150–153° C. were added 30 g. (.50 mole) of 1,1-dimethylhydrazine. After 18 hours of refluxing a clear solution had formed. Upon removal of the excess dimethylhydrazine by distillation, the residue set to a white, crystalline solid. After slurrying with ether and collecting the solid by filtration, 22.5 g. (96%) of colorless crystals of M.P. 154–156° C. were obtained. When mixed with a sample of N-phenylsuccinimide a melting range of 128–136° C. was obtained. Upon recrystallization from acetonitrile colorless crystals of M.P. 154–156° C. were obtained.

EXAMPLE III

N-dimethylamino-N'-methylcarbamylsuccinamide

By reacting succinamide with methylisocyanate there was prepared N-methylcarbamylsuccinamide of M.P. 153–155° C. (d). To a mixture of 15.6 g. (.10 mole) of this compound and 40 g. of acetonitrile was added 6.0 g. (.10 mole) of 1,1-dimethylhydrazine. After keeping the resulting solution at room temperature for 15 minutes there formed a crystalline precipitate. After standing for an additional 1 hour this mixture was cooled in an ice bath. Filtration gave 13 g. of white crystals of M.P. 172–174° C. A sample recrystallized from acetonitrile gave M.P. 177–179° C.

EXAMPLE IV

N-dimethylamino-N'-(2-chlorophenyl)succinamide (A) To 10.5 g. (0.05 moles) of N-(2-chlorophenyl) succinimide, M.P. 110–112° C., was added 20 ml. (15.6 g. 0.26 moles) of 1,1-dimethylhydrazine. The mixture was refluxed overnight. The solid was filtered to yield 8.3 g.

white powder M.P. 141–142–5° C. An infrared spectrum showed peaks at 6.00μ and 6.09μ.

(B) To 158 g. (0.76 moles) N-(2-chlorophenyl) succinimide was added 120 ml. (94 g. 1.6 moles) 1,1-dimethylhydrazine. The mixture was allowed to reflux for 3 hours during which time a solid mass formed. Ether was added to the mixture, the solid mass broken and filtered. Yield: 188 g. (93%) M.P. 148–151° C. after recrystallization from ethyl acetate. An infrared spectrum appeared identical with the sample melting at 141–142.5° C.

EXAMPLE V

A representative list of compounds prepared by these methods and representative of compounds of the present invention are shown in Table I. All give infrared spectra with two strong bands or one broad band in the 6.0–6.2μ region indicative of amides and hydrazides.

or aqueous spray with an application rate of 1.0 to 100 pounds per acre.

The chemicals of the invention are effective growth regulants and are particularly useful for retarding the vegetative growth of plants by shortening their internodes. The growth regulant activity of the chemicals is of particular interest in connection with retardation of vegetative growth of fruit trees without decreasing fruit size. Furthermore, the activity of these chemicals is of interest for producing other beneficial effects on fruit such as color, stop-drop, prolonged harvesting period, increased storageability, overcoming juvenility and return blossoming. Another beneficial growth regulant effect of interest in connection with retardation of vegetative plant growth is inducing resistance to frost, smog, drought and salinity.

The effectiveness of the chemicals of the present invention as plant growth regulants is illustrated in the following examples using growth retardation as criterion for activity.

TABLE I

| | | | | | | Analysis (percent) | | | | | | | |
|---|---|---|---|---|---|---|---|---|---|---|---|---|---|
| | | | | | | Calculated | | | | Found | | | |
| R₁ | R₂ | R₃ | R₄ | M.P.° C. | Empirical formula | C | H | N | Cl | C | H | N | Cl |
| Methyl | Methyl | Ortho-chlorophenyl | Hydrogen | 148–51 | C₁₂H₁₆N₃O₂Cl | 53.43 | 5.93 | 15.62 | 13.16 | 53.68 | 6.14 | 15.74 | 12.97 |
| Methyl | Methyl | Phenyl | Hydrogen | 155–56 | C₁₂H₁₇N₃O₂ | 61.26 | 7.28 | 17.86 | | 61.22 | 7.41 | | |
| Methyl | Methyl | Hydrogen | Hydrogen | 195–7 | C₆H₁₃N₃O₂ | 45.27 | 8.23 | 26.40 | | 45.18 | 8.17 | 26.16 | |
| Methyl | Methyl | Ortho-ethoxyphenyl | Hydrogen | 137–8 | C₁₄H₂₁N₃O₃ | 60.20 | 7.58 | 15.04 | | 60.39 | 7.81 | 15.29 | |
| Methyl | Methyl | Methyl | Methyl | 73–4 | C₈H₁₇N₃O₂ | 51.32 | 9.15 | 22.44 | | 51.57 | 9.45 | 22.26 | |
| Pentamethylene | | Ortho-chlorophenyl | Hydrogen | 179–80 | C₁₅H₂₀N₃O₂Cl | 58.14 | 6.51 | 13.60 | | 58.54 | 6.53 | 13.94 | |
| Methyl | Methyl | Ortho-fluorophenyl | Hydrogen | 131.5–32.5 | C₁₂H₁₆N₃O₂F | 56.89 | 6.37 | 16.59 | | 56.90 | 6.56 | 16.69 | |
| Methyl | Methyl | Ethyl | Hydrogen | 154–7 | | | | | | | | | |
| Methyl | Methyl | Hydroxyethyl | Hydrogen | 161–3 | | | | | | | | | |
| Methyl | Methyl | N-dimethylaminopropyl | Hydrogen | 105–8 | | | | | | | | | |
| Methyl | Methyl | Amino | Hydrogen | 129–32 | | | | | | | | | |
| Methyl | Methyl | Ortho-tolyl | Hydrogen | 162–3 | | | | | | | | | |
| Methyl | Methyl | Para-tolyl | Hydrogen | 192–5 | | | | | | | | | |
| Methyl | Methyl | Para-ethoxyphenyl | Hydrogen | 176–9 | | | | | | | | | |
| Methyl | Methyl | Meta-chlorophenyl | Hydrogen | 176–7 | | | | | | | | | |
| Methyl | Methyl | Para-chlorophenyl | Hydrogen | 212–14 | | | | | | | | | |
| Methyl | Methyl | 2,6-dichlorophenyl | Hydrogen | 185–6 | | | | | | | | | |
| Methyl | Methyl | Para-hydroxyphenyl | Hydrogen | 138–42 | | | | | | | | | |
| Methyl | Methyl | Alpha-naphthyl | Hydrogen | 164–7 | | | | | | | | | |
| Methyl | Methyl | Ortho-nitrophenyl | Hydrogen | 203–5 | | | | | | | | | |
| Methyl | Methyl | Ortho-bromophenyl | Hydrogen | 158–159.5 | | | | | | | | | |

The chemicals of the present invention may be applied to plants, which term includes various plant parts such as seeds, flowers, fruits, vegetables, roots and foliage in various manners. Seeds may be treated directly with the chemical by incorporating the chemical in the soil before or after planting the seeds. The chemicals may be applied to plants in an inert medium as dust in admixture with a powdered solid carrier, such as the various mineral silicates, e.g., mica, talc, pyrophyllite and clays or as an aqueous composition. The chemicals may be applied in admixture with small amounts of surface-active wetting agents, which may be anionic, non-ionic, or cationic surface-active agents, generally as aqueous compositions. The chemicals may be dissolved in organic solvents such as acetone, and the solutions of the chemicals emulsified in water with the aid of surface-active agents. Such surface-active agents are well known and reference is made to U.S. Pat. No. 2,547,724, columns 3 and 4 for detailed examples of the same. The chemicals of the invention may be admixed with powdered solid carriers, such as mineral silicates, together with a surface-active agent so that a wettable powder may be obtained which may be applied directly to plants, or which may be shaken up with water for application to the plants in that form.

As a foliar spray the chemicals may be applied to growing plants at a rate of 0.01 to 10 pounds per acre. Such application is generally as an aqueous spray which also contains as note above, a surface-active dispersing agent and a powdered solid carrier.

As a soil treatment the amount of the chemical applied to the seed or crop rows will be from 0.1 to 10 pounds per acre, applied to the crop rows, the equivalent of an area 2″ wide and 2″ deep to parallel rows in one direction a distance of 40″ apart. Also, as a soil treatment the chemical may be applied broadcast as a similar dust

EXAMPLE A

This example illustrates the treatment of growing plants with the chemicals of the present invention.

Water solutions or dispersions of the chemicals were prepared containing 5000 parts per million (p.p.m.) of various chemicals of the invention and 300 p.p.m. of a surface-active wetting agent (polyoxyethylene sorbitan monolaurate) which is known to be inactive in the tests run.

Peanut plants in the 2 to 3 leaf stage were sprayed to run off with aqueous compositions prepared as above containing 5000 p.p.m. of compound. The treated plants and untreated control plants were then placed in a chamber having 100% humidity and a temperature of 75° F. After 24 hours, they were taken out and placed in a greenhouse. The plants were examined four weeks after the application of the chemicals. The growth regulant effect was recorded by measuring the length of the internodes of the peanut plants. The results are calculated and expressed in percent growth retardation as compared to the untreated check. They are shown in Table II:

TABLE II.—GROWTH RETARDATION IN PEANUT SPRAY TEST

| R¹=R² | R³ | R⁴ | Percent retardation |
|---|---|---|---|
| CH₃ | H | H | 63 |
| CH₃ | CH₃ | CH₃ | 54 |
| CH₃ | Phenyl | H | 79 |
| CH₃ | 4-ethoxyphenyl | H | 71 |
| CH₃ | 2-chlorophenyl | H | 92 |
| CH₃ | 2-ethoxyphenyl | H | 79 |
| CH₃ | o-Tolyl | H | 88 |
| CH₃ | 2,6-dichlorophenyl | H | 92 |
| Succinic acid 2,2-dimethylhydrazide | | | 90 |
| Untreated control | | | 0 |

Other crops such as soybeans, pinto beans, apple trees and chrysanthemum show similar growth retardation on treatment with the chemicals of the present invention.

EXAMPLE B

This example illustrates the growth regulant effect on plants grown in soil which has been treated with compounds of the present invention.

256 mg. of chemical were thoroughly mixed in a glass jar with two pounds of clean, dry sand. The mixing was accomplished by vigorously shaking the jar which was covered with a screwcap. This masterbatch was then thoroughly mixed with 12 pounds of soil to give a 40 p.p.m. concentration in the sand soil mixture. The treated soil was then placed into 12 ounce styrofoam cups. Three peanut seeds, Virginia Runner variety, were planted in each cup 2 weeks after soil incorporation of the chemical using 3 replicates for each treatment. An untreated check replicated three times in which seeds were planted at the same time without chemical treatment was included in the test. The pots were then transferred to the greenhouse, kept warm and moist maintaining a greenhouse temperature of 75–85° F. Four weeks after planting the growth of the peanut plant was measured, i.e., the distance from the node of the first true leaf to the upper most leaf stipule. The results are expressed as percent growth retardation as compared with the untreated check plants (Table III).

TABLE III.—GROWTH RETARDATION OF PEANUT PLANTS IN SOIL INCORPORATION TESTS

| $R^1=R^2$ | $R^3$ | $R^4$ | Percent retardation, 2 wks. |
|---|---|---|---|
| $CH_3$ | $CH_2CH_2$—OH | H | 27 |
| $CH_3$ | $CH_3$ | $CH_3$ | 26 |
| $CH_3$ | Phenyl | H | 26 |
| $CH_3$ | 2-ethoxyphenyl | H | 25 |
| $CH_3$ | 2-chlorophenyl | H | 45 |
| Succinic acid 2,2-dimethylhydrazide | | | 0 |

EXAMPLE C

This example illustrates the growth regulant effect on apple trees without fruit size reduction.

Spray solutions containing 2000 p.p.m. active chemical were sprayed on 10 year old McIntosh apple trees using one gallon per tree and 2 trees per treatment. Check trees without chemical treatment and trees sprayed with succinic acid 2,2-dimethylhydrazide were included in the test. The applications were made approximately 2 weeks after full bloom. Measurement on the new growth or shoots on the branches were taken 7 weeks later measuring the distance from the growth present at the time of spray to the tip of the shoot. Five shoots per tree were measured. The fruit was harvested and evaluated for size differences.

The results showing the length of the shoot growth and size of the apples is shown in Table IV.

TABLE IV.—APPLE SPRAY TEST

| | Shoot size (cm.) | Apple size (inches) | | | |
|---|---|---|---|---|---|
| | | 2¼ | 2½ | 2¾ | 3 |
| Succinic acid 2,2-dimethyl hydrazide | 4.6 | 3 | 10 | 22 | 9 |
| N-dimethylamino-N'(2-chlorophenyl) succinamide | 7.6 | | | 6 | 38 |
| Control | 17.4 | | | 13 | 31 |

Having thus described our invention, what we claim and desire to protect by Letters Patent is:

1. A compound having the formula:

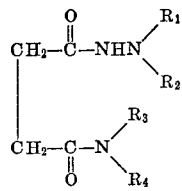

wherein $R_1$ and $R_2$ are alkyl groups or, compositely with the nitrogen, form a 1-pyrrolidyl, 1-piperidyl or a 4-morpholinyl ring; and $R_3$ and $R_4$ are hydrogen, an alkyl group, or, compositely with the nitrogen atom, form a 1-pyrrolidyl, 1-piperidyl or a 4-morpholinyl ring; or, where $R_4$ is hydrogen, $R_3$ is:

hydroxylalkyl,
N-dimethylamino alkyl ethyl,
amino,
R'NHCO-₁ where R' is hydrogen or a lower alkyl,
phenyl,
naphthyl,
substituted phenyl or naphthyl,
wherein the substituents are from 1 to 3 halogen, lower alkoxy, phenoxy, lower alkyl, phenyl, naphthyl, cyano, carboxyl, carbomethoxy, acetoxy, hydroxyl, or nitro groups;
the aforesaid alkyl, hydroxyalkyl and aminoalkyl groups having from 1 to 12 carbon atoms and the aforesaid lower alkyl and alkoxy groups having from 1 to 6 carbon atoms.

2. A compound of claim 1 wherein $R_1$ and $R_2$ are methyl.

3. A compound of claim 1 wherein $R_4$ is hydrogen and $R_3$ is phenyl or a phenyl group having a halogen, lower alkoxy, phenoxy, lower alkyl, phenyl, cyano, carboxyl, hydroxyl, or nitro substitution.

4. A compound of claim 3 wherein the substitution on the phenyl group is on the ortho- or para- position.

5. The compound of claim 1 wherein $R_1$ and $R_2$ are methyl, $R_4$ is hydrogen and $R_3$ is 2-chlorophenyl.

6. The compound of claim 1 wherein $R_1$ and $R_2$ are methyl, $R_4$ is hydrogen and $R_3$ is o-tolyl.

7. The compound of claim 1 wherein $R_1$ and $R_2$ are methyl, $R_4$ is hydrogen and $R_3$ is o-ethoxyphenyl.

References Cited

UNITED STATES PATENTS

| 3,064,051 | 11/1962 | Sprague et al. | 260—561 |
| 3,062,881 | 11/1962 | Gutmann | 260—561 |
| 3,450,673 | 6/1969 | McKillip | 260—558 |

OTHER REFERENCES

Szmuszkovicz et al., J. Med. & Pharm. Chem., vol. 4, pp. 259–96 (1961).

HENRY R. JILES, Primary Examiner

H. I. MOATZ, Assistant Examiner

U.S. Cl. X.R.

260—247.2 A, 247.7 H, 294 A, 294.7 E, 326 R, 326 N, 326 A, 326.3, 326.85, 465 D, 471 R, 488 CD, 518 R, 553 R, 553 C, 553 E, 558 H, 558 A, 559 H, 561 H, 561 K; 71—88, 94, 95, 105, 106, 111, 114, 118, 119, 120

PO-1050
(5/69)

UNITED STATES PATENT OFFICE
CERTIFICATE OF CORRECTION

Patent No. 3,632,646    Dated January 4, 1972

Inventor(s) Howard A. Hageman et al.

It is certified that error appears in the above-identified patent and that said Letters Patent are hereby corrected as shown below:

In column 6, claim 1, line 19, delete the words "N-dimethylamino alkyl ethyl", and insert instead --N-dimethylaminoalkyl--.

Signed and sealed this 5th day of September 1972.

(SEAL)
Attest:

EDWARD M. FLETCHER, JR.
Attesting Officer

ROBERT GOTTSCHALK
Commissioner of Patents